United States Patent [19]
Keech

[11] Patent Number: 5,544,944
[45] Date of Patent: Aug. 13, 1996

[54] ADJUSTABLE UTILITY TRAILER

[76] Inventor: Charles R. Keech, 86364 Panorama Rd., Springfield, Oreg. 97478

[21] Appl. No.: 278,374

[22] Filed: Jul. 20, 1994

[51] Int. Cl.⁶ .................................................. B60P 1/12
[52] U.S. Cl. ........................... 298/5; 280/482; 414/483
[58] Field of Search ........................... 280/482; 298/5, 298/6; 414/483

[56] References Cited

U.S. PATENT DOCUMENTS

| | | | |
|---|---|---|---|
| 2,525,506 | 10/1950 | Wiedman | 280/33.4 |
| 2,569,965 | 10/1951 | Wiedman | 298/5 X |
| 2,876,036 | 3/1959 | Olson | 280/482 X |
| 3,420,390 | 1/1969 | Taggart | 280/482 X |
| 4,119,224 | 10/1979 | Moody | 280/656 |
| 4,511,181 | 4/1985 | Schantz | 298/5 |
| 4,659,147 | 4/1987 | Smiltneek | 298/5 X |
| 4,685,855 | 8/1987 | Celli | 414/482 |
| 4,889,390 | 12/1989 | Campbell | 298/5 |

*Primary Examiner*—Karen B. Merritt
*Assistant Examiner*—Janice L. Krizek

[57] ABSTRACT

A utility trailer that can be configured to the cargo being hauled. The trailer having a right side, left side, opening front and rear endgates, an adjustable length tongue to allow long loads to extend forward of trailer box, a frame that pivots forward of the axle, which allows the trailer box to tilt rearward.

1 Claim, 6 Drawing Sheets

ADJUSTABLE UTILITY TRAILER

BACKGROUND-FIELD OF INVENTION

This invention relates to utility trailers, specifically to such trailers which are light weight that can be adjusted to the load being hauled.

BACKGROUND OF THE INVENTION

It is often desirable to carry bulky and odd shaped cargo in a trailer, which would be pulled behind a small car. In past art various means have been used to carry cargo. But there hasn't been a small utility trailer able to carry large cargo such as a refrigerator, washer-dryer, lumber, and sheet plywood. A need has existed for a simple light-weight utility trailer that can be configured to carrying cargo and towed behind a small car. This invention increases hauling capacity of a trailer by making the box sides rigid to the bed with hinged opening endgates and an extendable tongue. Furthermore, a tilt bed facilitates loading and unloading certain cargo.

According to the present invention, an adjustable trailer is possible which can be towed by a small car and has improved characteristics with respect to weight, size, and load carrying ability.

OBJECTS AND ADVANTAGES

By means of this invention there has been provided a light weight bolt together utility trailer which by unique openable front and rear endgates, adjustable length tongue and tilting box a variety of cargo can be hauled.

The trailer box is a rigid U shape with high sides reinforced by end-gussets bolted to the bed. The gussets are strong enough to support the sides of the box and keep cargo in place.

At each end of the trailer box is an end-gate which is hinged at the bottom. The endgates are held in a vertical closed position by removable pins in eye loops. The front endgate is opened by removing the pins and arcing the endgate downward to set at a slight angle from horizontal on the frame. The rear endgate when open is held horizontal and level with the box bed by a chain. When both end gates are open the length of the bed is increased about 60%.

Side stake openings are provided at the upper side ledges of the trailer box for adding side racks to help carry tall cargo.

An adjustable extendable tongue telescopes inside the trailer frame and is held in position with a bolt. Locating marks are painted on the tongue to show the 3 positions the tongue can extend. Long cargo such as lumber can be hauled with the end gates opened and tongue extended. Another example is sheet plywood which is hauled when the trailer is configured with the tongue extended to the second position while the front end-gate is open and the rear end-gate is closed preventing the load shifting rearward.

Another feature of this utility trailer is a box that tilts to aid loading and unloading cargo. By using a pivot between the frame and a tongue housing the trailer box can tilt rearward. The box tilts when the tongue is extended and a tilt lock bolt is removed. The box is free to rotate on the frame pivot when pushed down at the rear of said box. The pivot has a preload to prevent rocking near the tilt balance point. The trailer box is only tilted for loading and unloading. For transport the pivot lock bolt holds the frame and tongue housing together as a rigid unit.

The trailer bolts together and can be shipped as a kit in a small package to be assembled later.

The utility trailer is of simple, light-weight construction, and can be efficiently handled in all of its modes for towing various sizes of cargo.

The above features are objects of this invention and further objects will appear in the detailed description which follows and will be otherwise apparent to those skilled in the art.

For the purpose of illustration a preferred embodiment is shown in the accompanying drawing. It is to be understood that the drawing is for the purpose of example only and the invention is not limited thereto.

DRAWING FIGURES

In the drawings, closely related figures have the same number.

Figure 1:
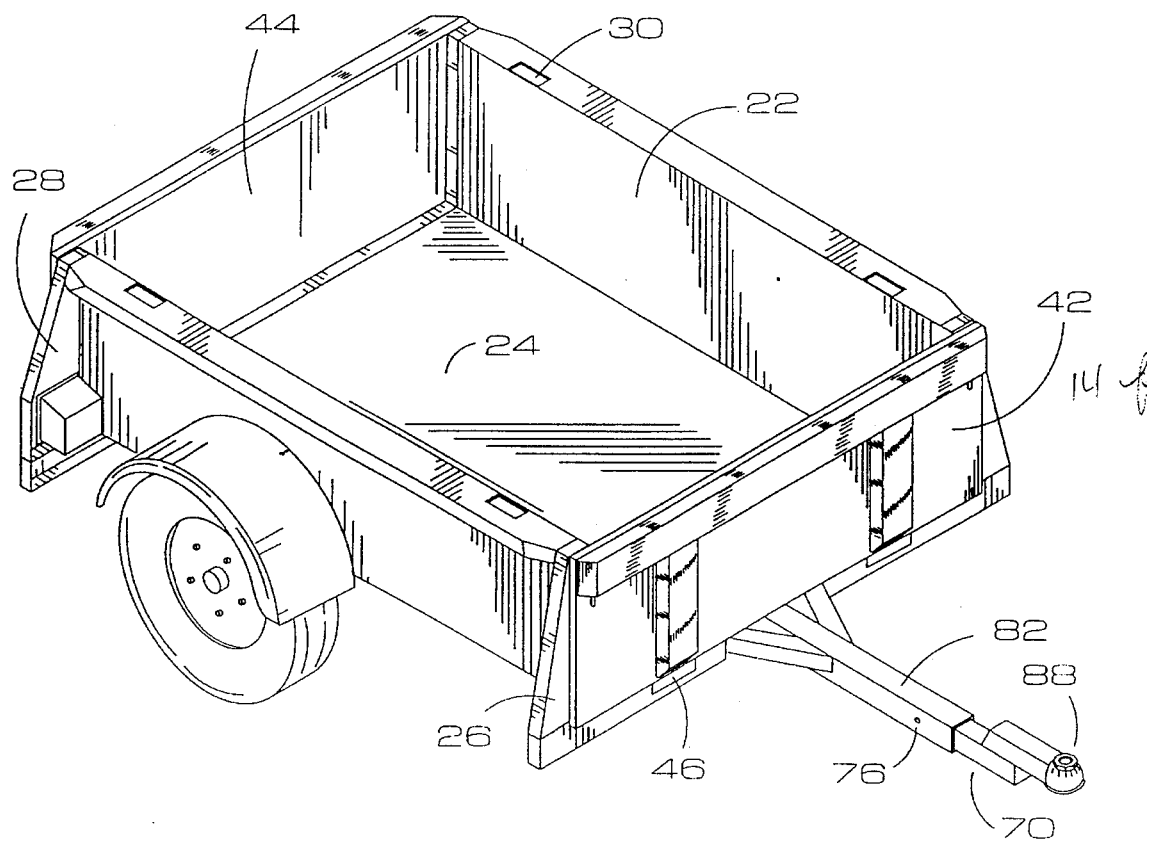
FIG. 1 shows an isometric view of a utility trailer in the closed position.

REFERENCE NUMERALS IN DRAWINGS 20 box
24 bed
28 rear gusset
32 eye-loop
36 taillight lens
40 taillight mount holes
44 rear endgate
48 pin
52 chain
56 pivot bracket
60 tongue housing
64 tilt-lock hole
68 tilt-lock keeper
72 position holes
76 tongue-lock bolt
80 extension-lock hole
84 wiring
22 side
26 front gusset
30 stake opening
34 fender
38 taillight housing
42 front endgate
46 hinge
50 slot
54 frame
58 pivot bolt
62 pivot bearing 66 tilt-lick bolt
70 tongue
74 position arrow
78 typical leaf spring straight axle and wheel assembly
82 non-tilting frame
86 flexible pipe

DESCRIPTION FIGS. 1 to 8

Figure 2:
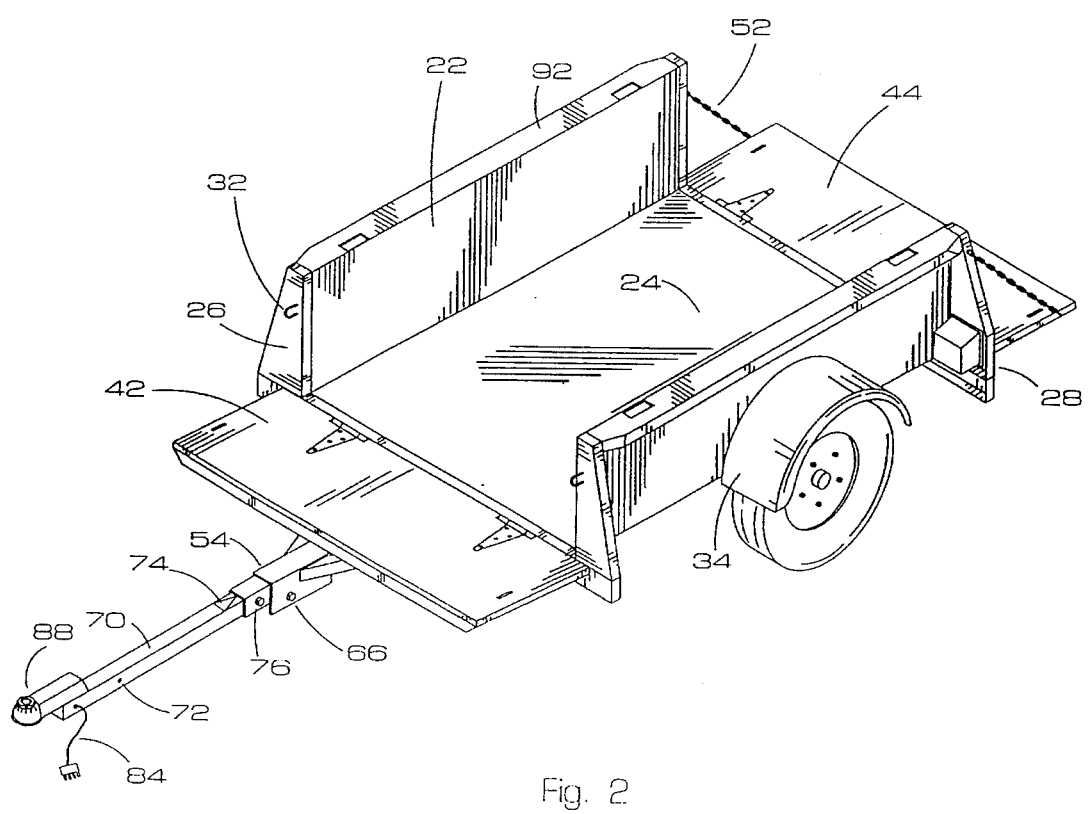
FIG. 2 shows an isometric view of a utility trailer in the opened and extended position.
Figure 3A:
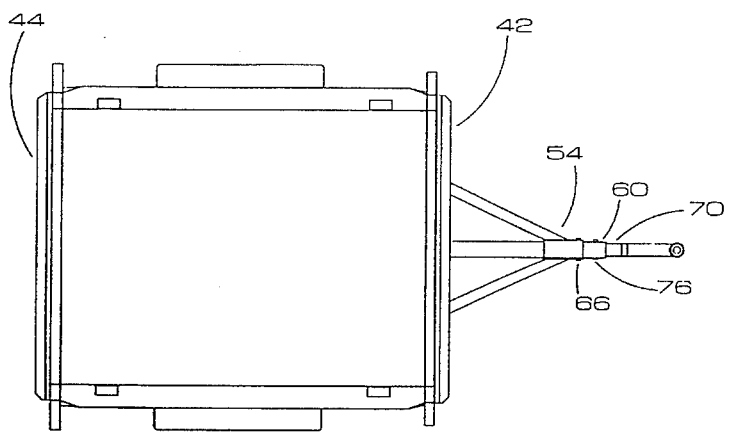
FIGS. 3A to 3C show top, side and front views of a utility trailer.
Figure 3B:
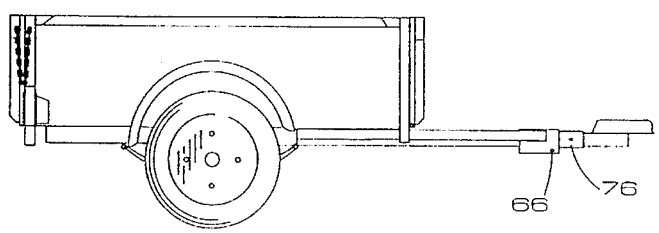
Figure 3C:
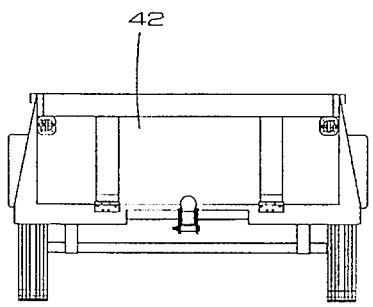
Figure 4A:
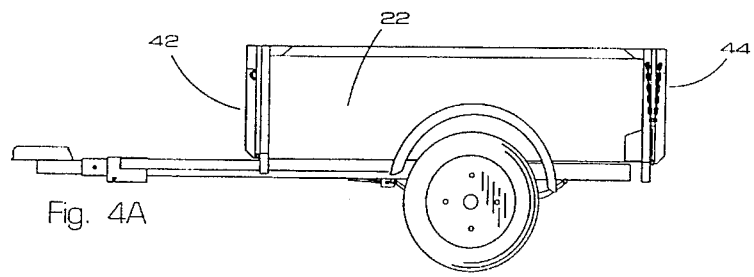
FIGS. 4A to 4D show side views of a utility trailer configuration in various positions.
Figure 4B:
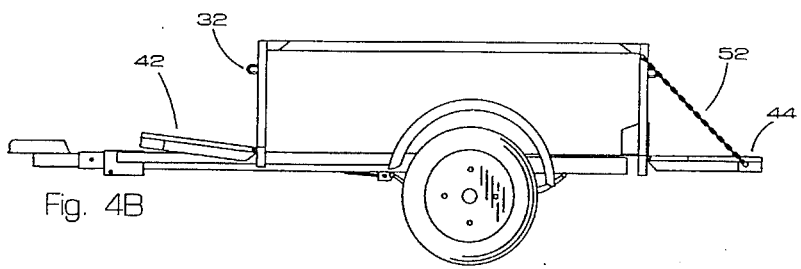
Figure 4C:
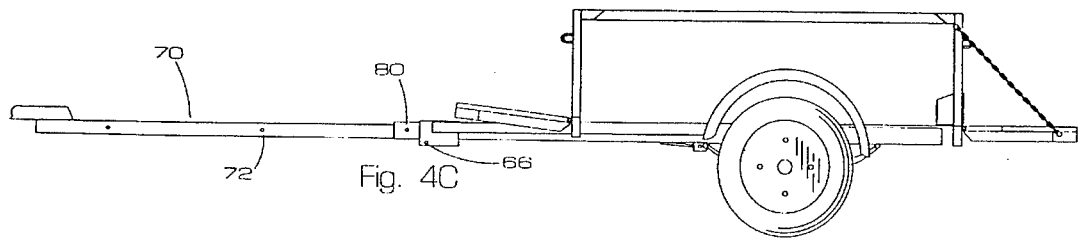
Figure 4D:
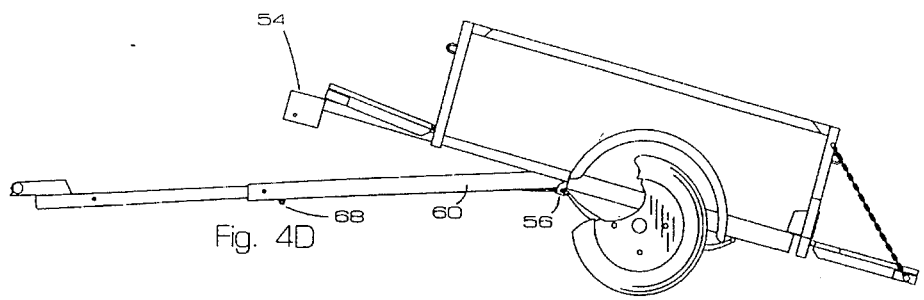
Figure 5:
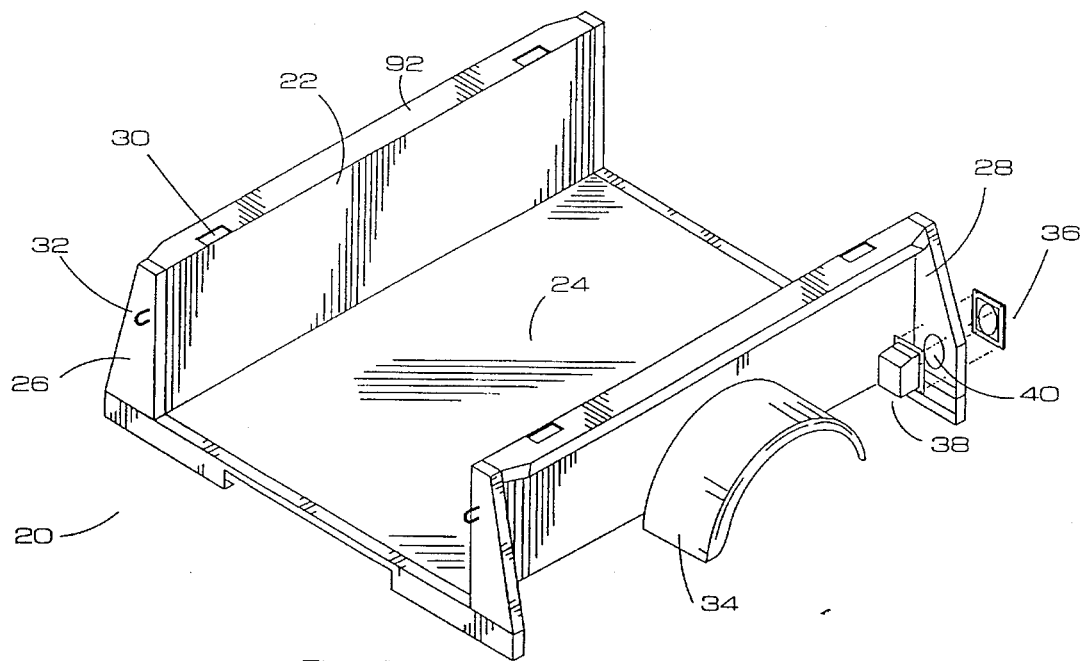
FIG. 5 shows an isometeric view of a trailer box.
Figure 6A:
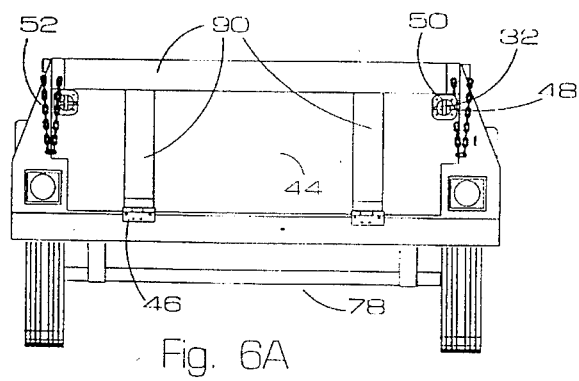
FIGS. 6A and FIG. 6B shows detail portion of the endgate and the system used to keep the endgates closed.
Figure 6B:
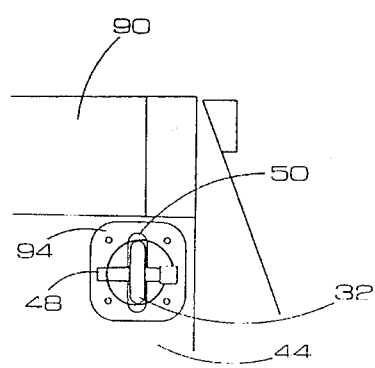
Figures 7, 8:
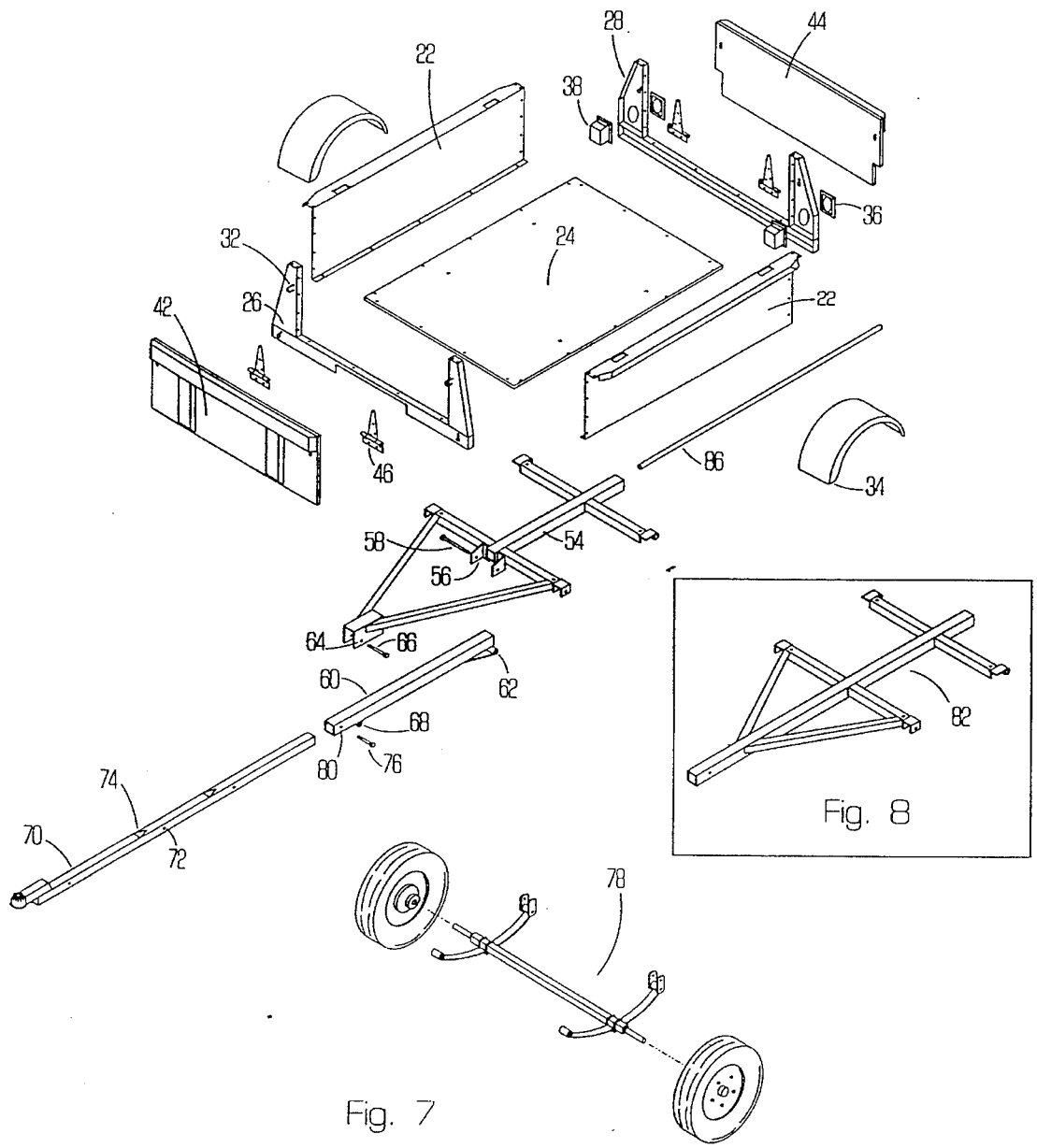
FIG. 7 shows an isometeric view of the main parts of a utility trailer.
FIG. 8 shows an isometric view of a non-tilting frame

A typical embodiment of the trailer of the present invention is illustrated in FIG. 1 and FIG. 2. The trailer consists of a U-shaped box 20 (FIG. 5) comprised of sides 22 bolted to a bed 24 and held rigid with a front gusset 26 and a rear gusset 28. A front endgate 42 (FIG. 7) and a rear endgate 44 are mounted at ends of said box with hinges 46. Said hinges bolt in place and allow the endgate to swing downward to open. The trailer bed's effective length increases about 30% for each open endgate. Screws hold taillight housing 38 (FIG. 6) and lens 36 sandwiched between the rear gusset 28 where a taillight mount hole 40 is provided. Taillight lens 36 is protected from breakage by a cut out in rear endgate 44. Eye loops 32 welded to the box keeps endgates closed by a pin 48 (FIGS. 6A, 6B). Fenders 34 are bolted to the box sides. In addition the sides are bent 90 degrees at the top forming a ledge 92 over 3" wide with stake openings 30 for 2×4 lumber side stakes (not shown). Box 20 is attached to a frame 54 by bolts forming a single structural unit (FIG. 7). A typical leaf spring straight axle assemble 78 is bolted to the frame and provides suspension and running gear for the trailer. Each endgate have a reenforcement boss 90 (FIG. 6A) along the outside top horizontal edge and above and perpendicular to the hinge axis, said endgate is held closed in a vertical position by a pin 48 in an eye-loop 32 FIG. 6B. A slot 50 cut in the endgate provides a means which said eye-loop passes through and extends out the back side of said endgate far enough to insert said pin. The pin is held in place with a standard tractor implement flip ring. A rub plate 94 covers the area around the slot where said pin rubs. The front endgate 42 swings open and rests on frame 54 at a slight angle from horizontal. The rear end gate 44 swings open and is held level with the trailer bed by a chain 52 (FIG. 4B).

Frame 54 consists of a hollow tube center with angle steel brackets and pivot bracket 56 forming mounts for trailer box 20, axle assembly 78 and a tongue housing 60. Said tongue housing has a pivot bearing 62 welded to the inner end which allows mounting to said pivot bracket by pivot-bolt 58. The tongue housing swings against the frame and is held in place with a tilt-lock bolt 66 through a tilt-lock hole 64 and a tilt-lock keeper 68. In this position the hollow centers of the tongue housing and the frame align allowing an elongated tongue 70 to slide inside. Said tongue has a coupling hitch 88 welded on the forward end for towing. The tongue has a series of position holes 72 drilled along its length with arrows painted on the top of said tongue to help locate and line up one of the said position holes with an extension-lock hole 80. A tongue-lock bolt 76 is inserted through said extension-lock hole and the position hole which locks the tongue to the tongue housing.

Trailer box 20 tilts by pivoting on pivot bolt 58 mounted between pivot bracket 56 and pivot bearing 62. Said box is free to tilt when tongue 70 is pulled out of the frames 54's hollow center by extending said tongue to the middle extension position and removing a tilt lock bolt 76. The trailer box tilts back when manually lifted at the front or pushed down at the rear.

Wiring 84 FIG. 2 for lights is routed inside the tongue, the tongue housing and the frame with a flexible pipe 86 (FIG. 7) attached inside the rear of the said frame and projecting forward into the tongue providing a means to reduce friction on wire insulation and reduce wire tangle as the tongue is extended and the box tilted.

A no tilt option is available to reduce cost by replacing frame 54 and tongue housing 60 with non-tilting frame 82 (FIG. 8).

The utility trailer in this invention has many aspects, which when combined makes a simple, clean, light weight, versatile cargo hauler that increases the usefulness of any small car.

Operation-FIGS. 4A, 4B, 4C, 4D and FIG. 7

First the utility trailer of this invention bolts together and can be assembled at the factory, store or by the end user.

The operation of the trailer is simple and efficient. When configured in the closed retracted position the trailer is compact. Yet with a box with high sides, end gates that open and a tongue that extends, the trailer can be configured to haul many sizes of loads in addition the trailer tilts for loading and unloading cargo.

The trailer is normally loaded in the hitched position. For small size cargo both end gates are kept closed. The high sides keep the load secure when traveling.

For long loads such as lumber, pipe, rebar and the like, both endgates are opened with the tongue extended. Endgates open by removing pins 48 and swinging said endgates down. When both endgates are open the trailer bed length is increased by 60%. The tongue is extended by removing a tongue-lock bolt 80 and pushing back on the trailer box until one of the position arrows 74 align with a tongue housing 60. Installing said tongue-lock bolt holds the tongue in the extended position. The high rigid sides of the trailer box helps secure the cargo. To further reduce load shifting the cargo is tied to the forward portion of the tongue.

When hauling medium length cargo the front endgate is opened, the tongue is extended to the middle position, and the rear end gate is closed which prevents the load for moving back. This is the best position to haul 4'×8' sheet plywood.

The trailer box tilts to help load and unload small utility and recreational vehicles. The box tilts rearward by removing a tilt-lock bolt 66 and applying a downward force at the open rear end gate. When the rear end gate contacts the ground it acts as a ramp and as the vehicle is moved in the trailer box the weight is shifted forward tilting the box to the normal level position. By installing said tilt-lock bolt the box is held in position for travel.

The trailer has a feel that can only be realized by use. That is when presented with a transportation problem, and solved by one of the many modes of configuration.

SUMMARY OF INVENTION

Accordingly, the reader will see that the adjustable utility trailer of this invention can be used to carry a variety of sized cargo because of the unique construction of the U shaped box with hinged opening endgates in combination with an extendible tongue. In addition a pivoting frame provides a means to tilt the trailer box for easy loading and unloading. Furthermore the utility trailer has the additional advantages in that

* it secures small size loads when the end gates are closed because the sides are next to or near the cargo, reducing load shift.
* it permits hauling 4'×8' sheet plywood when the front end gate is open and the tongue B in extended; it prevents the load from shifting rearward because the rear end gate is closed.
* it permits transporting long loads (such as lumber) when both end gates are open and the tongue is extended full length. In this situation the load is secured by the gusset supported sides on the trailer box which prevent the load from shifting side ways.
* it permits transporting small vehicles such as motorcycles, garden tractors, R.V. vehicles with the rear endgate down. In this situation the load is secure by tying the vehicle against the closed front endgate.
* it permits good vehicle handling because the the load and therefore the center of gravity is low to the ground.
* it permits the trailer box to tilt aiding loading and unloading certain cargo.

Although the description above contains many specificities, these should not be construed as limiting the scope of the invention but as merely providing illustrations of some of the presently preferred embodiments of this invention. For example this trailer can be scaled up for hauling larger cargo.

Thus the scope of the invention should be determined by the appended claims and their equivalents, rather than by the example given.

I claim:

1. An adjustable trailer for transporting cargo comprising:

(a) a box having a right side, a left side, a front end and a rear end;

(b) an axle assembly including an axle mounted to spring means;

(c) a hollow frame having a forward end and a longitudinal axis, said frame having a tilt lock hole located at the forward end and a pivot bracket, said box being mounted to said frame, said axle assembly being mounted to said frame at a location on said frame that is rearwardly of said pivot bracket;

(d) a hollow tongue housing having a rear end and a longitudinal axis, an extension lock hole, a tilt lock keeper and a pivot bearing located at the rear end of said tongue housing, said pivot bracket of said frame being releasably connected to said pivot bearing of said tongue housing by a pivot bolt, whereby the longitudinal axis of said frame is substantially aligned with the longitudinal axis of said tongue housing when said pivot bracket is connected to said pivot bearing by said pivot bolt;

(e) an elongated tongue having a hitch means for connecting the trailer to a vehicle and a series of position holes spaced along the length of said tongue, whereby said tongue telescopes into said hollow frame and said hollow tongue housing and is releasably locked to said tongue housing by a tongue-lock bolt that extends through one of said position holes and said extension lock hole on said tongue housing;

(f) a front endgate having a bottom and hinge means mounted to said bottom for pivotally connecting said front endgate to the front end of said box whereby said front endgate can be pivoted into an open position in which said front endgate rests on said frame; and (g) a rear end gate having a bottom and hinge means mounted to said bottom for pivotally connecting said rear endgate to the rear end of said box.

* * * * *